United States Patent [19]
Takeshita et al.

[11] Patent Number: 5,198,150
[45] Date of Patent: Mar. 30, 1993

[54] FERROELECTRIC LIQUID CRYSTAL COMPOSITION

[75] Inventors: Fusayuki Takeshita; Makoto Kikuchi; Mitsuyoshi Ichihashi; Kanetsugu Terashima, all of Chiba; Kenjii Furukawa, Kanagawa, all of Japan

[73] Assignee: Chisso Corporation, Osaka, Japan

[21] Appl. No.: 397,420

[22] PCT Filed: Dec. 23, 1988

[86] PCT No.: PCT/JP88/01295
§ 371 Date: Aug. 16, 1989
§ 102(e) Date: Aug. 16, 1989

[87] PCT Pub. No.: WO89/06265
PCT Pub. Date: Jul. 13, 1989

[30] Foreign Application Priority Data
Dec. 25, 1987 [JP] Japan ............... 62-329058

[51] Int. Cl.$^5$ ............... C09K 19/12; C09K 19/20; G02F 1/13; G09K 19/34
[52] U.S. Cl. ............... 252/299.61; 252/299.66; 252/299.67; 252/299.68; 359/103
[58] Field of Search ............... 252/299.61, 299.66, 252/299.68, 299.67; 359/103

[56] References Cited

U.S. PATENT DOCUMENTS

| | | | |
|---|---|---|---|
| 4,668,427 | 5/1987 | Saito et al. | 252/299.66 |
| 4,753,752 | 6/1988 | Raynes et al. | 252/299.65 |
| 4,780,241 | 10/1988 | Furukawa et al. | 252/299.63 |
| 4,784,791 | 11/1988 | Saito et al. | 252/299.6 |
| 4,882,083 | 11/1989 | Terashima et al. | 252/299.61 |
| 4,911,863 | 3/1990 | Sage et al. | 252/299.65 |
| 4,931,208 | 6/1990 | Furukawa et al. | 252/299.61 |
| 4,952,335 | 8/1990 | Furukawa et al. | 252/299.61 |

FOREIGN PATENT DOCUMENTS

| | | |
|---|---|---|
| 0178647 | 10/1985 | European Pat. Off. . |
| 0206228 | 6/1986 | European Pat. Off. . |
| 0269062 | 11/1987 | European Pat. Off. .. |
| 0315455 | 11/1988 | European Pat. Off. . |
| 62-89646 | 9/1987 | Japan . |
| 63-37187 | 7/1988 | Japan . |
| 63-301 | 4/1989 | Japan . |

*Primary Examiner*—Robert L. Stoll
*Assistant Examiner*—C. Harris
*Attorney, Agent, or Firm*—Leydig, Voit & Mayer

[57] ABSTRACT

A ferroelectric liquid crystal composition is provided which includes at least one achiral compound represented by formula (I)

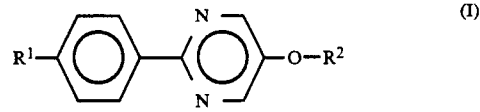

wherein each of $R^1$ and $R^2$ is an alkyl group having 1 to 18 carbon atoms, at least one optically active compound represented by formula (II)

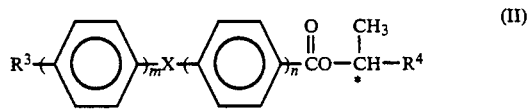

wherein $R^3$ is an alkyl group or an alkoxy group having (Abstract continued on next page.)

1 to 18 carbon atoms, $R^4$ is an alkyl group having 2 to 18 carbon atoms, X is a single bond, —COO—, —OCO—, —N=CH—, —CH=N—, —OCH$_2$— or —CH$_2$O—, each of m and n is an integer of 1 or 2, and the symbol * is an asymmetric carbon atom, and at least one compound represented by formula (III)

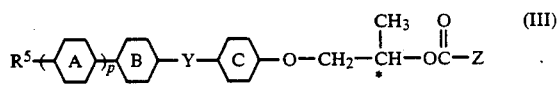

wherein each of

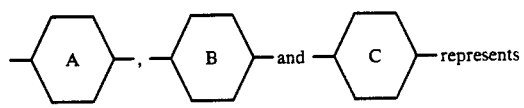

-continued

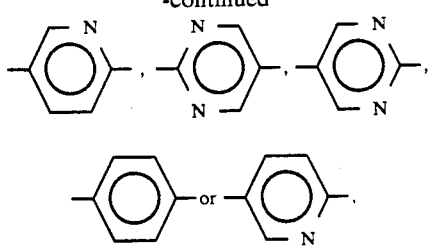

$R^5$ is an alkyl group or an alkoxy group having 1 to 18 carbon atoms, Y is a single bond, —CH$_2$O— or —OCH$_2$—, p is an integer of 0 or 1, and Z is an alkyl group having 1 to 18 carbon atoms or —C*H(CH$_3$)—O—R$^6$, wherein $R^6$ is an alkyl group having 1 to 18 carbon atoms and the symbol * represents an asymmetric carbon atoms.

14 Claims, 1 Drawing Sheet

FERROELECTRIC LIQUID CRYSTAL COMPOSITION

TECHNICAL FIELD

The present invention relates to a ferroelectric liquid crystal material. More specifically, it relates to a ferroelectric liquid crystal composition having quick response properties which comprises a smectic liquid crystal compound and a optically active compound, and an light switching element in which the above-mentioned composition is contained.

BACKGROUND TECHNIQUE

Liquid crystal compounds are widely used as materials for display elements, and most of these liquid crystal elements are based on a TN type display system and liquid crystal materials are in the state of nematic phase.

The TN type display system has advantages such as less tiredness of the eyes and extremely small consumption of electric power because of being of the non-emissive type, whereas it has disadvantages such as slow response and disappearance of display at certain visual angles. In recent years, this system is being improved in such a direction as to keep up characteristics of flat displays, and in particular, quick response and the enlargement of the visual angle are demanded.

In order to meet these demands, improvements in liquid crystal materials have been attempted. However, as compared with other emissive type displays (e.g., electroluminescence displays and plasma displays), it is apparent that the TN type display system is much poorer with regard to response time and the extent of the visual angle.

In order that characteristics of the liquid display element such as features of the non-emissive type and the small consumption of electric power may be maintained and in order that the quick response corresponding to that of the emissive type displays may be assured, it is essential to develop a novel liquid display system in place of the TN type display system.

As one of such attempts, a display system in which the light switching phenomenon of ferroelectric liquid crystals is utilized has been suggested by N. A. Clark and S. T. Lagerwall (see Appl. Phys. Lett. 36, p 899, 1980).

The presence of the ferroelectric liquid crystals was announced for the first time in 1975 by R. B. Mayer et al. (see J. Phys., 36, p 69, 1975), and from the viewpoint of a liquid crystal structure, these crystals belong to a chiral smectic C phase, a chiral smectic I phase, a chiral smectic F phase, a chiral smectic G phase and a chiral smectic H phase (hereinafter referred to simply as "$S_C^*$ phase", "$S_I^*$ phase", "$S_F^*$ phase", "$S_G^*$ phase" and "$S_H^*$ phase", respectively).

In the chiral smectic phase, molecules form a layer and tilt to the surface of the layer, and a helical axis is vertical to this layer surface. In the chiral smectic phase, spontaneous polarization takes place, and therefore, when a DC electric field is applied to this layer in parallel therewith, the molecules rotate about the helical axis in accordance with their polarity. Display elements containing the ferroelectric liquid crystals utilize this switching phenomenon.

Nowadays, of the chiral smectic phases, much attention is particularly paid to the $S_C^*$ phase. As the display systems in which switching phenomenon of the $S_C^*$ phase is utilized, there is a birefringence type system using two polarizers and a guest/host type system using a dichoric dye. Features of these display systems are as follows:

(1) The response is very quick.
(2) Memory properties are present.
(3) Display performance is not quite so affected by the visual angle.

Thus, the display systems have the possibility of achieving the high-density display and are considered to be effectively utilizable in the display elements.

However, in the case that this ferroelectric liquid crystal is used in the practical display elements, there are now many problems such as slow response properties and very difficult alignment.

Therefore, requirements which are necessary for the ferroelectric liquid crystal materials are (1) further improvement in the response properties,
(2) the exhibition of the $S_C^*$ phase in a wide temperature range inclusive of room temperatures, and
(3) improvement in alignment.

At present, no chiral smectic liquid crystal compounds in a single state which satisfy all of such requirements are present, and thus one attempt is to provide a ferroelectric liquid crystal composition satisfying the above-mentioned requirements by mixing several chiral smectic liquid crystal compounds or several non-liquid crystal compounds which can meet a part of the above-mentioned requirements.

In addition to the ferroelectric liquid crystal compositions each comprising the ferroelectric liquid crystal compound alone, Japanese Patent Laid-open Publication No. 195,187/1986 discloses a ferroelectric liquid crystal composition which can be prepared by mixing one or more compounds assuming a ferroelectric liquid crystal phase with fundamental materials of compounds and compositions assuming achiral smectic C, F, G, H and I phases (hereinafter referred to simply as "$S_C$ and other phases").

Furthermore, another ferroelectric liquid crystal composition is also reported in which one or more compounds having optical activity but not assuming any ferroelectric liquid crystal phase are mixed with fundamental materials of compounds and compositions assuming the $S_C$ and other phases (Mol. Cryst. Liq. Cryst., 89, p 327, 1982).

The above-mentioned smectic liquid crystal mixture which comprises the fundamental material assuming at least one of the achiral $S_C$ and other phases and which has at least one of the $S_C$ and other phases will be hereinafter referred to as the base Sm mixture.

The preferable base Sm mixture is a liquid crystal mixture assuming the $S_C$ phase in an extensive temperature range inclusive of room temperatures. Components for the base Sm mixture are suitably selected from liquid crystal compounds such as phenylbenzole series, Schiff base series, phenylpyridine series and 5-alkyl-2-(4-alkoxyphenyl)pyridine.

For example, in Japanese Patent Laid-open Publication No. 291,679/1986 and the pamphlet of PCT International Publication WO86/06401, the ferroelectric liquid crystal prepared by mixing 5-alkyl-2-(4-alkoxyphenyl)pyrimidine with an optically active compound can assume the $S_C^*$ phase in a wide temperature range inclusive of room temperatures. In the former publication, it is also described that when a light switching element is prepared by the use of a ferroelectric smectic liquid crystal material in which the above-mentioned pyrimidine derivative is used as the base Sm mixture, the thus prepared switching element has a shortened response time. Furthermore, in Japanese Patent Laid-open Publication No. 291,679/1986, it is disclosed that the ferroelectric liquid crystal material comprising 5-alkyl-2-(4'-alkylbiphenylyl-4)pyrimidine, 5-alkyl-2-(4-alkoxyphenyl)pyrimidine and an optically active compound also assumes the $S_C^*$ phase in an extensive temperature range including room temperatures, and that it is effective for the improvement in the response time. Nevertheless, improvement in the response properties at room temperatures is further demanded.

A first object of the present invention is to provide a ferroelectric liquid crystal composition having quick response properties, and a second object thereof is to provide a switching element containing the liquid crystal composition which has quick response properties.

DISCLOSURE OF THE INVENTION

A ferroelectric liquid crystal composition which is a first feature of the present invention comprises at least one of achiral compounds represented by the formula (I)

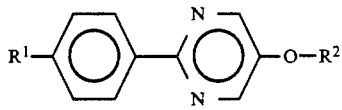

wherein each of $R^1$ and $R^2$ is an alkyl group having 1 to 18 carbon atoms, and at least one of optically active compounds represented by the general formula (II)

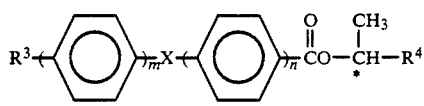

wherein $R^3$ is an alkyl group or an alkoxy group having 1 to 18 carbon atoms, $R^4$ is an alkyl group having 2 to 18 carbon atoms, X is a single bond, —COO—, —OCO—, —N=CH—, —CH=N—, —OCH$_2$— or —CH$_2$O—, each of m and n is an integer of 1 or 2, and the symbol * is an asymmetric carbon atom, and it is preferred that the amount of the compound represented by the formula (I) is from 20 to 98% by weight, and that of the compound represented by the formula (II) is from 1 to 40% by weight.

Furthermore, another ferroelectric liquid crystal composition of the present invention comprises a blend of the achiral compound represented by the formula (I) and the optically active compound represented by the formula (II) with a compound represented by the formula (III)

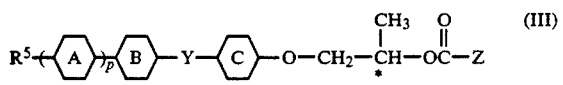

wherein each of

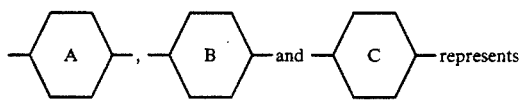 represents

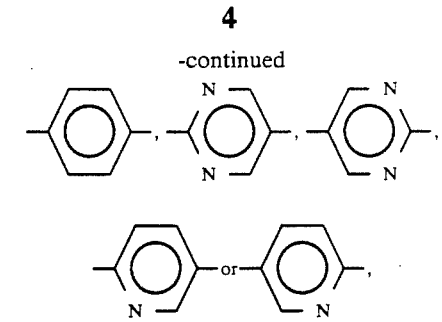

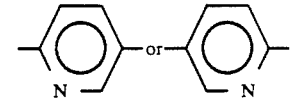

$R^5$ is a alkyl group or an alkoxy group having 1 to 18 carbon atoms, Y is a single bond, —CH$_2$O— or —OCH$_2$—, p is an integer of 0 or 1, and Z is an alkyl group having 1 to 18 carbon atoms or —C*H(CH$_3$)—O—R$^6$ wherein R$^6$ is an alkyl group having 1 to 18 carbon atoms and the symbol * represents an asymmetric carbon atom, and it is preferred that the amount of the compound represented by the formula (I) is from 20 to 98% by weight, that of the compound represented by the formula (II) is from 1 to 40% by weight, and that of the compound represented by the formula (III) is from 1 to 40% by weight.

A second invention of the present invention is directed to a light switching element containing a ferroelectric liquid crystal composition which contains at least one kind of achiral compounds represented by the formula (I) and at least one kind of optically active compound represented by the formula (II).

Another embodiment of the present case is directed to an light switching element which contains a compound represented by the formula (I), a compound represented by the formula (II) and a compound represented by the formula (III).

Examples of the optically active compounds represented by the formula (II) of the present invention include compounds having the following formulae

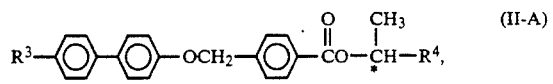 (II-A)

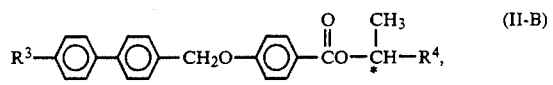 (II-B)

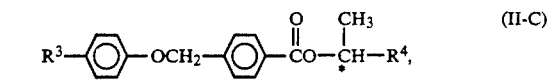 (II-C)

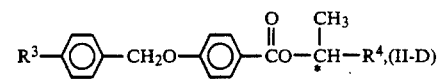(II-D)

wherein $R^3$ is an alkyl group or an alkoxy group having 1 to 18 carbon atoms, and $R^4$ is an alkyl group having 2 to 18 carbon atoms.

Typical preferable examples of the optically active compounds represented by the formula (II) include

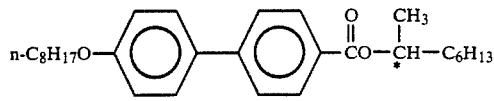

-continued

The optically active compounds represented by the formula (III) of the present invention include compounds represented by the following formulae

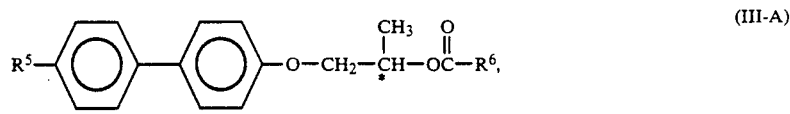   (III-A)

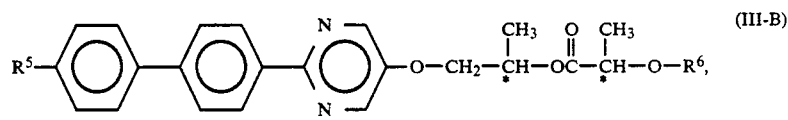   (III-B)

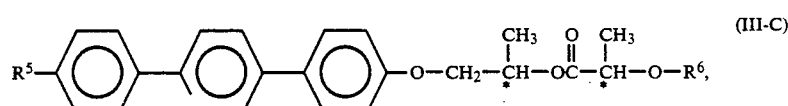   (III-C)

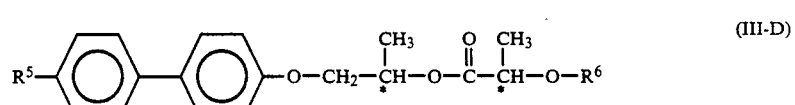   (III-D)

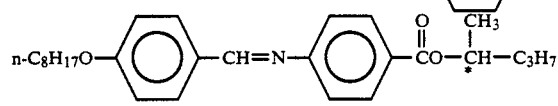

which are disclosed in Japanese Patent Laid-open Publication No. 118744/1984 and Ferroelectrics, 58, 21 (1984). In addition, similar compounds are described in Japanese Patent Laid-open No. 149547/1985.

wherein $R^5$ is an alkyl group or an alkoxy group having 1 to 18 carbon atoms, and $R^6$ is an alkyl group having 1 to 18 carbon atoms.

Typical examples of the optically active compounds represented by the formula (III) are as follows:

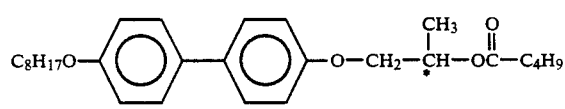

(Japanese Patent Application No. 133269/1986)

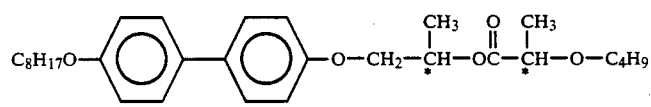

(Japanese Patent Application No. 49796/1987)

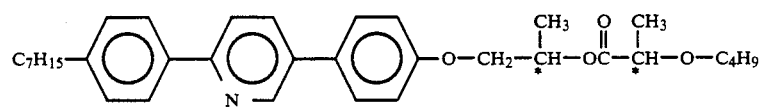

(Japanese Patent Application No. 220824/1987)

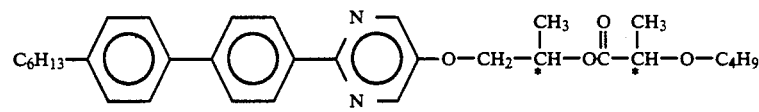

(Japanese Patent Application No. 103977/1987)

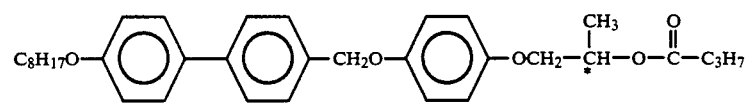

(Japanese Patent Application No. 25234/1987)

and 4'-heptyl-4-[4-{2-(butanoyloxy)-propoxy}-phenoxymethyl]-biphenyl and 4'-nonyl-4-[4-{2-(pentanoyloxy)-propoxy}-phenoxymethyl]-biphenyl.

Moreover, other compounds can be added to the liquid crystal composition of the present invention, so long as they do not disturb the accomplishment of the objects of the present invention.

As the achiral compound represented by the formula (I) of the present invention, a material having a smectic C phase is particularly preferable, but a material which does not exhibit the smectic C phase can also be used, though its amount is limited to such a range that the temperature range of the $S_c$ phase is not particularly reduced.

Main compounds of such a kind are exemplified in Table 1.

The compounds (I) shown in Table 1 are represented by the formula (I)

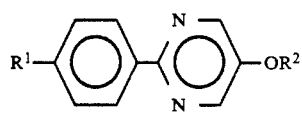

wherein $R^1 = n\text{-}C_xH_{2x+1}$ and $R^2 = n\text{-}C_yH_{2y+1}$.

With regard to phase states, Cr indicates a crystal state, $S_3$ an unknown smectic phase, $S_C$ a smectic C phase, $S_A$ a smectic A phase, N a nematic phase, and $I_{SO}$ an isotropic liquid phase. The symbols ● and — indicate the presence and the lack of each phase, respectively.

TABLE 1 (I)

| Compound (I) | | Phase Transition Series and its Transition Temperature | | | | | |
|---|---|---|---|---|---|---|---|
| X in $R^1$ | Y in $R^2$ | Cr | $S_3$ | $S_C$ | $S_A$ | N | $I_{SO}$ |
| 6 | 6 | ●47.0 | — | — | ●76.7 | — | ● |
| 6 | 7 | ●32.5 | — | ●50.6 | ●76.6 | — | ● |
| 6 | 8 | ●27.0 | — | ●67.5 | ●84.2 | — | ● |
| 6 | 9 | ●47.7 | — | ●77.2 | ●83.6 | — | ● |
| 6 | 10 | ●38.1 | ●(35.2) | ●82.4 | ●86.5 | — | ● |
| 6 | 11 | ●38.8 | ●42.3 | ●84.3 | ●86.4 | — | ● |
| 6 | 12 | ●35.0 | ●47.4 | ●85.6 | ●87.1 | — | ● |
| 6 | 13 | ●41.7 | ●48.0 | ●82.7 | ●84.8 | — | ● |
| 6 | 14 | ●34.4 | ●54.9 | ●85.2 | ●86.6 | — | ● |
| 6 | 15 | ●49.9 | ●56.7 | ●83.3 | ●85.2 | — | ● |
| 7 | 5 | ●44.3 | — | — | ●62.0 | ●64.2 | ● |
| 7 | 6 | ●49.1 | — | — | ●77.1 | — | ● |
| 7 | 7 | ●32.2 | — | ●45.0 | ●77.5 | — | ● |
| 7 | 8 | ●30.8 | — | ●64.0 | ●84.4 | — | ● |
| 7 | 9 | ●34.2 | — | ●76.3 | ●85.1 | — | ● |
| 7 | 10 | ●32.2 | ●33.4 | ●83.1 | ●87.7 | — | ● |
| 7 | 11 | ●38.7 | ●45.2 | ●86.8 | ●88.6 | — | ● |
| 7 | 12 | ●45.8 | ●54.2 | ●88.6 | ●89.3 | — | ● |
| 8 | 3 | ●71.5 | — | — | — | — | ● |
| 8 | 4 | ●47.3 | — | — | ●57.1 | ●61.1 | ● |
| 8 | 5 | ●44.0 | — | — | ●62.4 | — | ● |
| 8 | 6 | ●44.4 | — | — | ●76.0 | — | ● |
| 8 | 7 | ●45.1 | — | ●(39.0) | ●77.5 | | ● |
| 8 | 8 | ●38.4 | — | ●54.8 | ●83.6 | — | ● |
| 8 | 9 | ●40.0 | — | ●76.0 | ●84.6 | — | ● |
| 8 | 10 | ●40.3 | ●(32.8) | ●83.8 | ●88.4 | — | ● |
| 8 | 11 | ●55.6 | — | ●87.2 | — | — | ● |
| 8 | 12 | ●40.5 | ●57.8 | ●88.7 | — | — | ● |
| 8 | 13 | ●54.1 | ●62.2 | ●88.2 | — | — | ● |
| 9 | 2 | ●81.0 | — | — | — | ●(64.7) | ● |
| 9 | 6 | ●45.0 | — | — | ●75.8 | — | ● |
| 9 | 7 | ●38.5 | — | — | ●77.4 | — | ● |
| 9 | 8 | ●35.5 | — | ●53.0 | ●84.5 | — | ● |
| 9 | 9 | ●39.0 | — | ●73.9 | ●84.9 | — | ● |
| 9 | 10 | ●37.0 | ●(31.7) | ●83.0 | ●81.7 | — | ● |
| 9 | 11 | ●45.0 | ●46.2 | ●87.0 | — | — | ● |
| 9 | 12 | ●46.5 | ●59.3 | ●88.9 | — | — | ● |
| 9 | 13 | ●52.0 | ●65.3 | ●88.8 | — | — | ● |
| 10 | 5 | ●53.5 | — | — | ●59.6 | ●60.0 | ● |
| 10 | 6 | ●45.2 | — | — | ●74.0 | — | ● |
| 10 | 7 | ●44.0 | — | — | ●75.6 | — | ● |
| 10 | 8 | ●31.7 | — | ●43.0 | ●82.8 | — | ● |
| 10 | 9 | ●46.6 | — | ●71.4 | ●83.8 | — | ● |
| 10 | 10 | ●42.0 | — | ●80.9 | ●87.0 | — | ● |
| 10 | 11 | ●51.4 | ●(47.0) | ●86.5 | — | — | ● |

TABLE 1 (I)-continued

| Compound (I) | | Phase Transition Series and its Transition Temperature | | | | | |
|---|---|---|---|---|---|---|---|
| X in $R^1$ | Y in $R^2$ | Cr | $S_3$ | $S_C$ | $S_A$ | N | $I_{SO}$ |
| 10 | 12 | ●51.7 | ●59.4 | ●88.2 | — | — | ● |

The compound represented by the formula (I) in the liquid crystal composition of the present invention can be prepared by the following manufacturing process A.

Manufacturing Process A

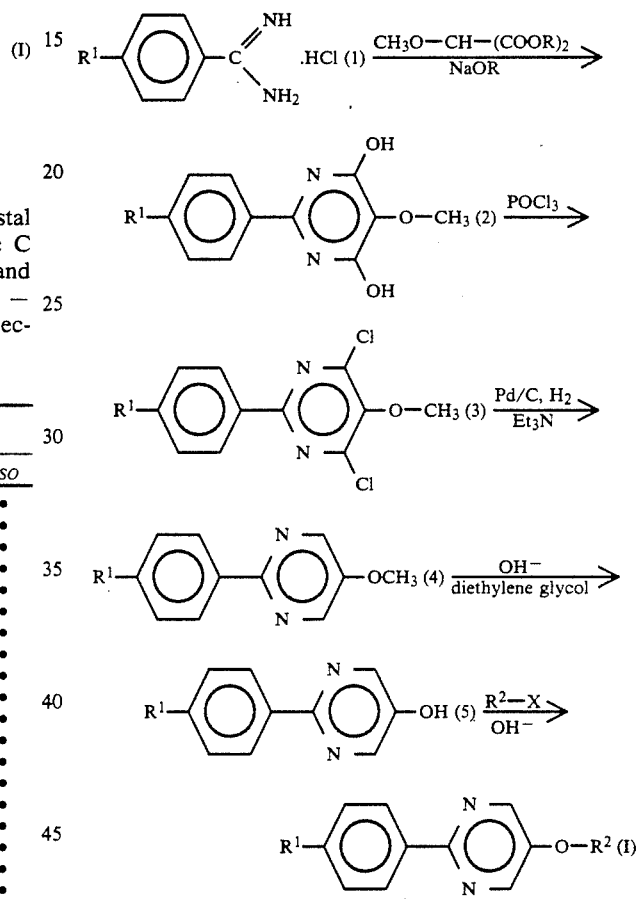

wherein R is an alkyl group such as methyl or ethyl, and X is an elimination group such as chlorine, bromine, iodine, a p-toluenesulfonyloxy group, a benzenesulfonyloxy group or a methanesulfonyl group.

That is, p-alkylbenzamidine hydrochloride (1) is reacted with methoxymalonic diester in the presence of a sodium alcoholate in order to form a diol (2), and the latter is then halogenated (3) with a halogenating agent such as phosphorus oxychloride. Afterward, dehalogenation is carried out in the presence of a base to form a dehalogenated compound (4), and the latter is then thermally treated in diethylene glycol in the presence of an alkali to obtain a compound (5). Furthermore, the latter compound is then subjected to etherification in order to prepare the desired compound (I).

Alternatively, the compound of the formula (I) may be also prepared by the following manufacturing process B.

Manufacturing Process B

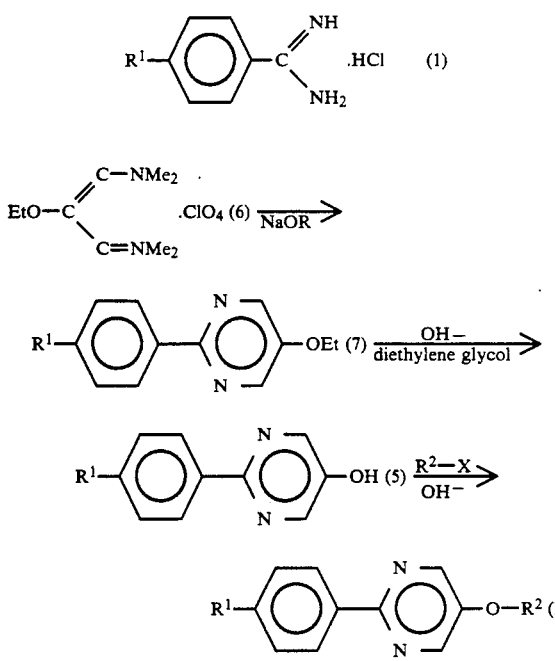

That is, a compound (6) described in Collection Czechoslov. Chem. Commun., 38, p 1168 (1973) is reacted with p-alkylbenzamidine hydrochloride (1) in the presence of a sodium alcoholate in order to form a compound (7), and the latter is then subjected to an alkali treatment to obtain a compound (5). The subsequent procedure is made in the same manner as in the above-mentioned manufacturing process A. The p-alkylbenzamidine hydrochloride which is the starting material is easily available and can be prepared from a p-alkylbenzonitrile by a known process.

The ferroelectric liquid crystal composition of the present invention has very excellent quick response properties, and when this composition is used, switching elements having quick response properties can be provided.

PREFERRED EMBODIMENTS TO PRACTICE THE INVENTION

Figure 1:
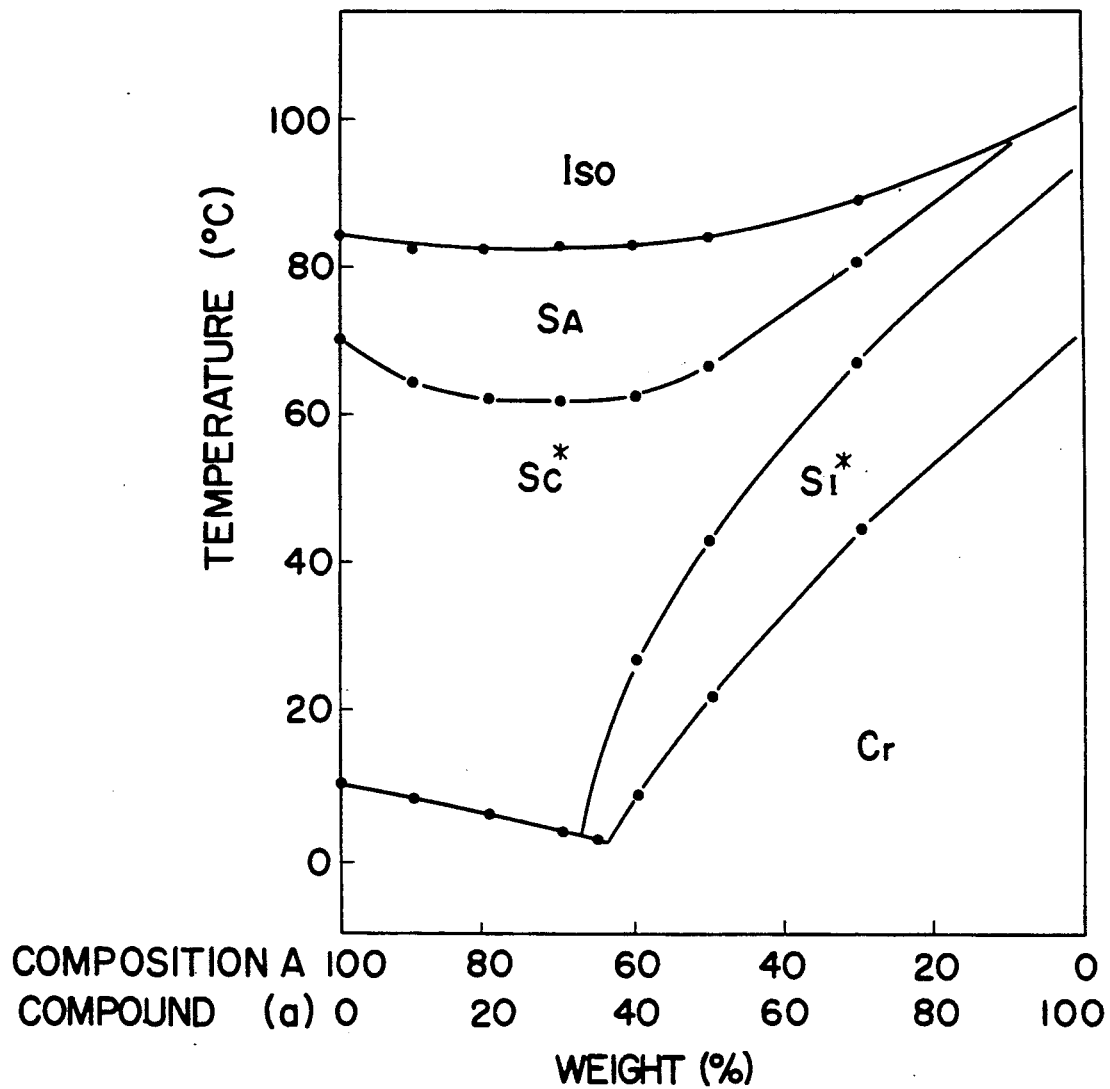
FIG. 1 shows a phase when a composition A in Example 1 is mixed with a compound represented by the formula (a).

The present invention will be described in detail with reference to the following examples, but it should not be limited to these examples.

EXAMPLE 1

A composition A comprising the following components represented by the formula (I) was prepared, and its physical properties were then measured. Components:

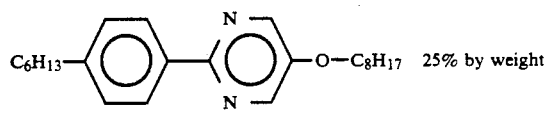 25% by weight

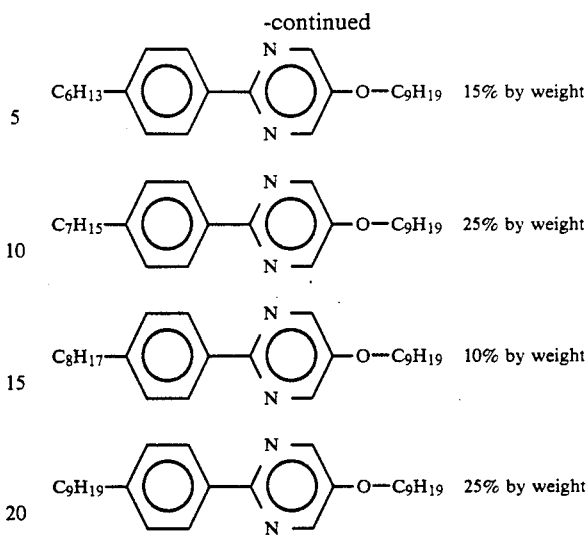

The phase transition temperature of the composition A was

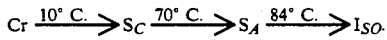

FIG. 1 shows a phase when the composition A was mixed with a compound represented by the formula (II)

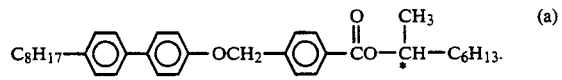

As exhibited in FIG. 1, an $S_I^*$ phase appears on a lower temperature side of an $S_C^*$ phase when the concentration of the compound (a) is 40% or more. In order that the $S_C^*$ phase is caused to appear at room temperatures, it is desirable that the concentration of the compound (a) is less than 40% or less.

Additionally, at various concentrations of the materials, response times ($\tau/\mu s$) at 25° C. and spontaneous polarization values ($Ps/nCcm^{-2}$) are as follows:

|  |  | $\tau/\mu s$ | $Ps/nCcm^{-2}$ |
|---|---|---|---|
| Composition A | 90% by weight | 80 | 7.0 |
| Compound (a) | 10% by weight | | |
| Composition A | 80% by weight | 40 | 14.5 |
| Compound (a) | 20% by weight | | |
| Composition A | 70% by weight | 35 | 25.0 |
| Compound (a) | 30% by weight | | |

As described above, when the achiral compound represented by the formula (I) is mixed with the optically active compound represented by the formula (II), the ferroelectric liquid crystal composition can be obtained which has the high upper limit temperature of the $S_C^*$ phase and excellent response properties.

Here, the phase transition temperature was measured from the observation of texture by means of DSC and a polarizing microscope. The response time was measured as follows: A liquid crystal element was first put between two polarizing plates perpendicular to each other, and a rectangular wave of ±10 V/μm and 1 KHz was then applied thereto, so that the strength of transmitted light changed. The response time was determined by this change. Furthermore, the spontaneous polarization values were measured in accordance with the Sowyer-Tower method. In the undermentioned examples, there were shown values under the same conditions.

EXAMPLE 2

A composition B was prepared by blending the composition A with the following compounds represented by the formula (III), and its physical properties were then measured.

Components:

Composition A

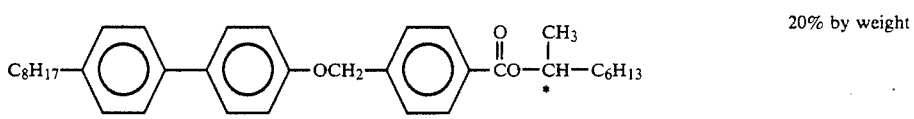

60% by weight

20% by weight

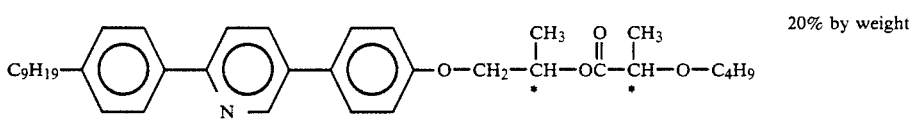

20% by weight

A phase transition temperature of the composition B was

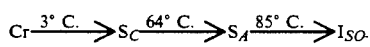

Furthermore, a response time at 25° C. was 28 microseconds.

In view of the fact that most of the conventional known ferroelectric liquid crystal compositions have a response time of 100 microseconds, it is definite that the ferroelectric liquid crystal composition of the present invention has very quick response properties.

EXAMPLE 3

A composition C was prepared from the following components represented by the formulae (I) and (II), and its physical properties were measured.

Components:

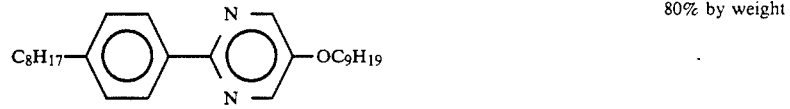

80% by weight

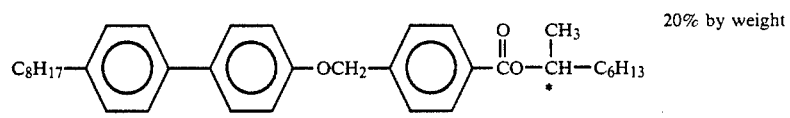

20% by weight

The phase transition temperature of the composition C was

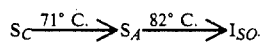

In the composition C, a response time ($\tau$) at 25° C. was 43 microseconds, a spontaneous polarization value (Ps) was 19.2 nCcm$^{-2}$, and a tilt angle was 22.5°.

EXAMPLE 4

A composition D having the following components was prepared from the compounds represented by the formulae (I) and (II), and its physical properties were measured.

Components:

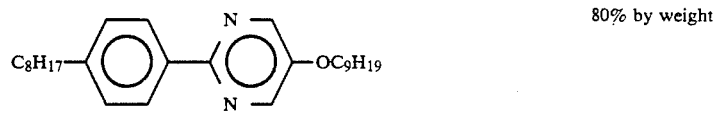

80% by weight

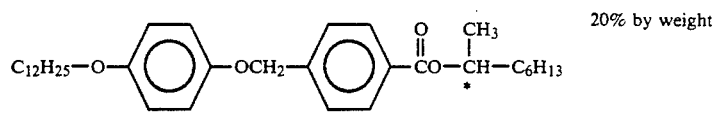

20% by weight

The phase transition temperature of the composition D was

In the composition D, a response time (τ) at 25° C. was 45 microseconds, a spontaneous polarization value (Ps) was 15.0 nCcm$^{-2}$, and a tilt angle was 20.9°.

EXAMPLE 5

A composition E was prepared from the following components represented by the formulae (I) and (II), and its physical properties were then measured.

Components:

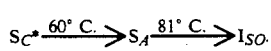

| Composition A | 80% by weight |
| --- | --- |
| (structure shown) | 20% by weight |

The phase transition temperature of the composition E was $$S_C^* \xrightarrow{60°\ C.} S_A \xrightarrow{81°\ C.} I_{SO}.$$

In the composition E, a response time (τ) at 25° C. was 41 microseconds, a spontaneous polarization value was 14.0 nCcm$^{-2}$, and a tilt was 20.8°.

EXAMPLE 6

A composition F comprising the following components represented by the formulae (I), (II) and (III) was prepared, and its physical properties were then measured.

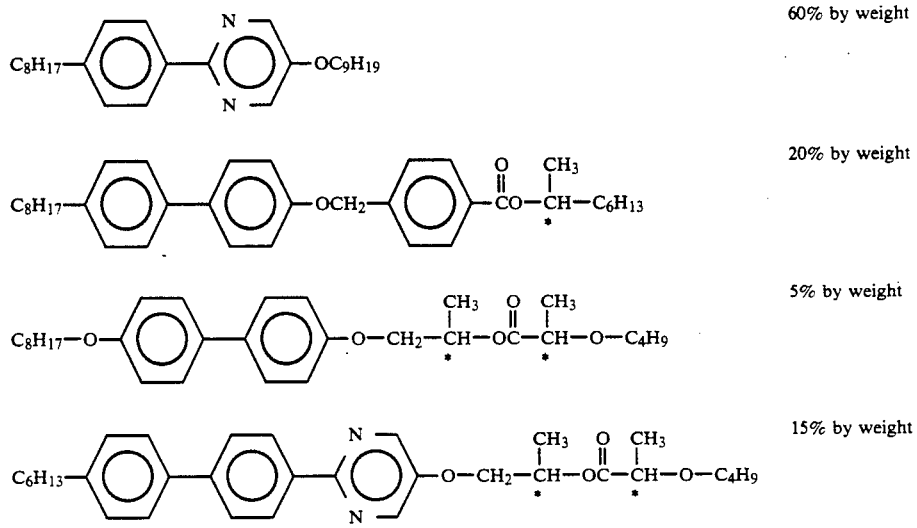

- 60% by weight
- 20% by weight
- 5% by weight
- 15% by weight

The phase transition temperature of the composition F was $$S_C^* \xrightarrow{53°\ C.} S_A \xrightarrow{77°\ C.} I_{SO}.$$

In the composition F, a response time (τ) at 25° C. was 23 microseconds, a spontaneous polarization value was 57.1 nCcm$^{-2}$, and a tilt angle was 20°.

EXAMPLE 7

A composition G comprising the following components represented by the formulae (I), (II) and (III) was prepared, and its physical properties were then measured.

Components:

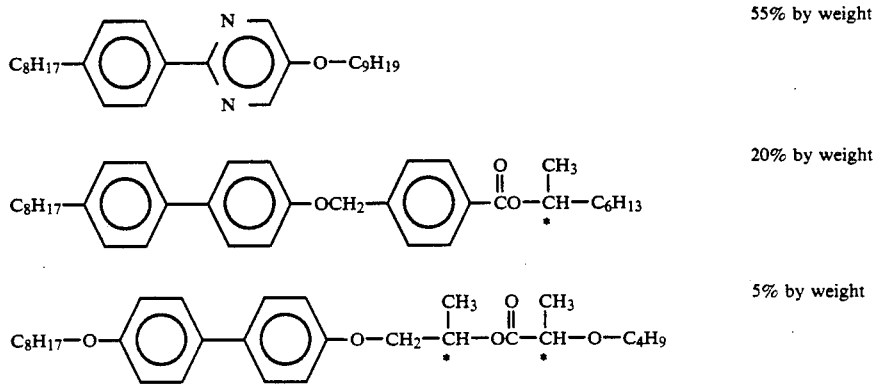

- 55% by weight
- 20% by weight
- 5% by weight

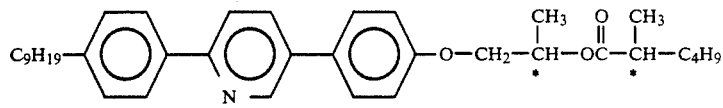 20% by weight

The phase transition temperature of the composition G was prepared, and its physical properties were then measured.

Components:

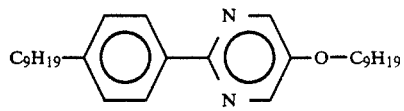 65% by weight

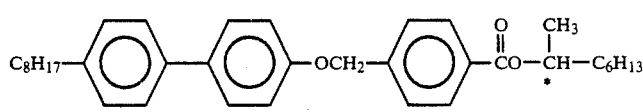 10% by weight

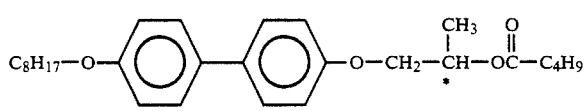 5% by weight

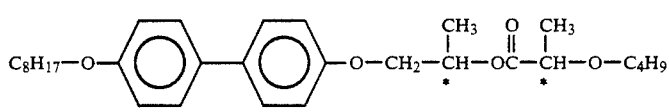 5% by weight

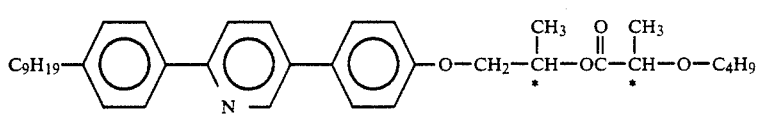 15% by weight

In the composition G, a response time ($\tau$) at 25° C. was 33 microseconds, a spontaneous polarization value was 87.5 nCcm$^{-2}$, and a tilt angle was 23.7°, and a response time ($\tau$) at 30° C. was 28 microseconds, a spontaneous polarization value was 81.4 nCcm$^{-2}$, and a tilt angle was 23.6°.

EXAMPLE 8

A composition H comprising the following components represented by the formulae (I), (II) and (III) was prepared, and its physical properties were then measured.

The phase transition temperature of the composition H was $S_{C^*} \xrightarrow{57° C.} S_A \xrightarrow{78° C.} I_{SO}$ In the composition H, a response time ($\tau$) at 25° C. was 25 microseconds, a spontaneous polarization value was 59.9 nCcm$^{-2}$, and a tilt angle was 22.1°.

EXAMPLE 9

A composition I comprising the following components represented by the formulae (I), (II) and (III) was prepared, and its physical properties were then measured.

Components:

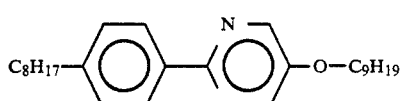 65% by weight

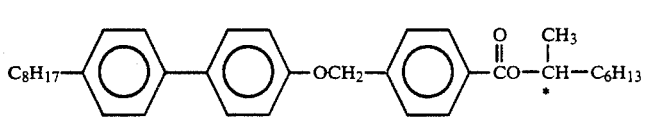 5% by weight

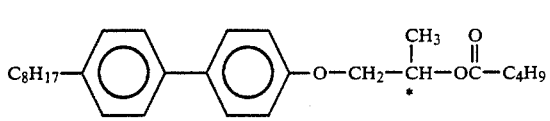 5% by weight

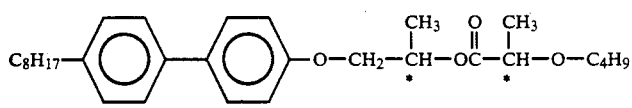 5% by weight

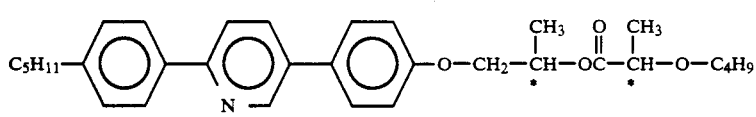 20% by weight

The phase transition temperature of the composition I was prepared, and its physical properties were then measured.

Components:

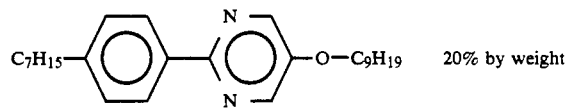 20% by weight

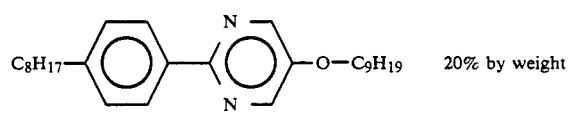 20% by weight

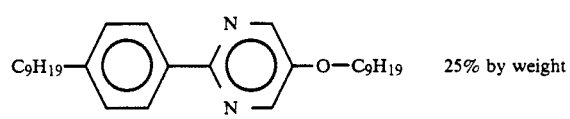 25% by weight

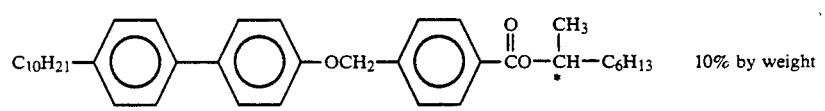 10% by weight

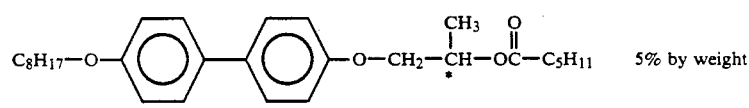 5% by weight

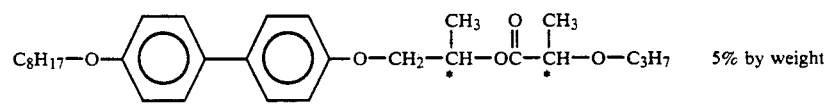 5% by weight

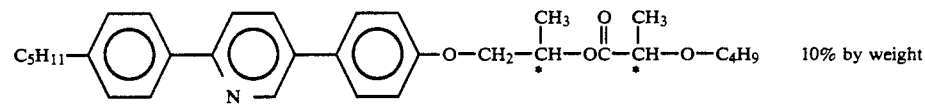 10% by weight

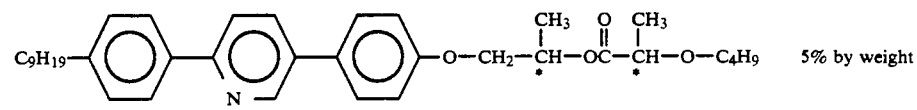 5% by weight

In the composition I, a response time ($\tau$) at 25° C. was 24 microseconds, a spontaneous polarization value was 66.9 nCcm$^{-2}$, and a tilt angle was 22.1°.

EXAMPLE 10

A composition J comprising the following components represented by the formulae (I), (II) and (III) was The phase transition temperature of the composition J was

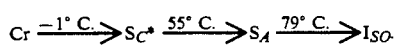

In the composition J, a response time ($\tau$) at 25° C. was 24 microseconds, a spontaneous polarization value was 57.0 nCcm$^{-2}$, and a tilt angle was 22.3°.

POSSIBILITY OF INDUSTRIAL UTILIZATION

The composition of the present invention can exhibit an $S_C^*$ phase in an extensive temperature range inclusive of room temperatures and has quick response properties, and therefore it can solve the problem of conventional liquid crystal elements which has been outstanding for a long time. Moreover, by the use of this liquid crystal composition, switching elements having quick response properties can be obtained.

We claim:

1. A ferroelectric liquid crystal composition comprising at least one achiral compound represented by formula (I)

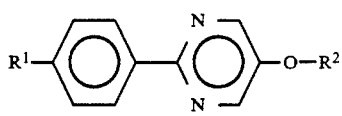

wherein each of $R^1$ and $R^2$ is an alkyl group having 1 to 18 carbon atoms, and at least one optically active compound represented by formula (II)

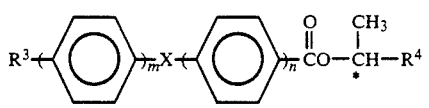

wherein $R^3$ is an alkyl group or an alkoxy group having 1 to 18 carbon atoms, $R^4$ is an alkyl group having 2 to 18 carbon atoms, X is a single bond, —COO—, —OCO—, —N=CH—, —CH=N—, —OCH$_2$— or —CH$_2$O—, each of m and n is an integer of 1 or 2, and the symbol * is an asymmetric carbon atom and at least one compound represented by formula (III)

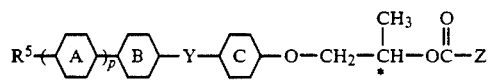

wherein each of

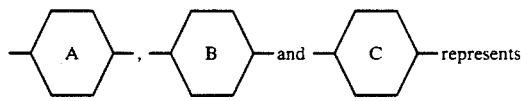

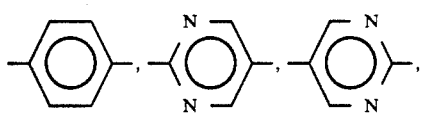

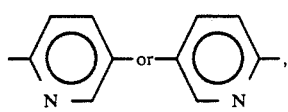

$R^5$ is an alkyl group or an alkoxy group having 1 to 18 carbons atoms, Y is a single bond, —CH$_2$O— or —OCH$_2$—, p is an integer of 0 or 1, and Z is an alkyl group having 1 to 18 carbon atoms or —C*H(CH$_3$)—O—R$^6$ wherein R$^6$ is an alkyl group having 1 to 18 carbon atoms and the symbol * represents an asymmetric carbon atom.

2. A ferroelectric liquid crystal composition according to claim 1 wherein the proportion of the compound represented by formula (I) is from 20 to 98% by weight, that of the compound represented by formula (II) is from 1 to 40% by weight and that of the compound represented by formula (III) is from 1 to 40%.

3. A ferroelectric liquid crystal composition according to claim 1 wherein the compound represented by the formula (I) comprises at least one compound wherein
$R^1$=n-C$_x$H$_{2x+1}$ and $R^2$=n-C$_y$H$_{2y+1}$ and wherein
when x=6, y=6 to 15,
when x=7, y=5 to 12,
when x=8, y=3 to 13,
when x=9, y=2 or 6 to 13, or
when x=10, y=5 to 12.

4. A ferroelectric liquid crystal composition according to claim 1 wherein the compound represented by formula (II) comprises at least one compound represented by the formulae

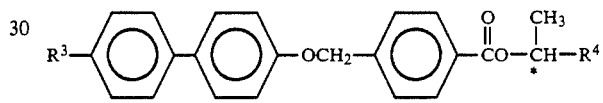

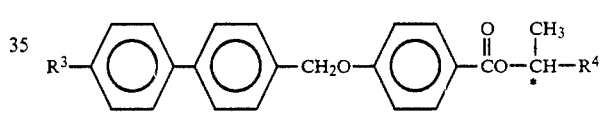

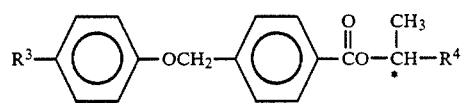

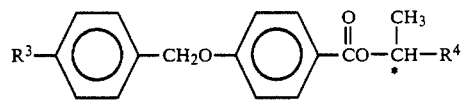

wherein $R^3$ is an alkyl group or an alkoxy group having 1 to 18 carbon atoms, and $R^4$ is an alkyl group having 2 to 18 carbon atoms.

5. A ferroelectric liquid crystal composition according to claim 1 wherein the compound represented by the formula (III) comprises at least one of the compounds represented by the formulae

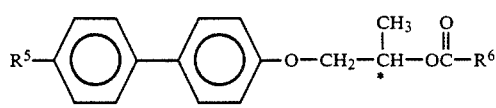

-continued

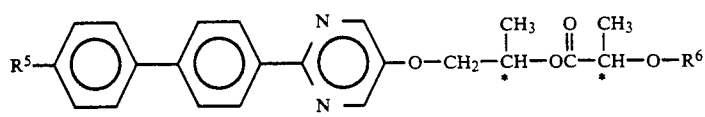

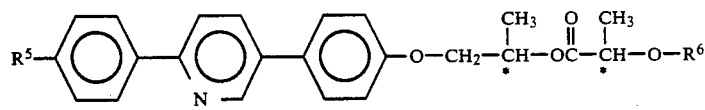

or

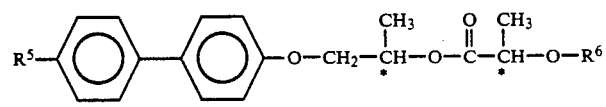

wherein R⁵ is an alkyl group or an alkoxy group having 1 to 18 carbon atoms, and R⁶ is an alkyl group having 1 to 18 carbon atoms.

6. A ferroelectric liquid crystal composition according to claim 1 wherein the compound represented by the formula (III) comprises at least one of

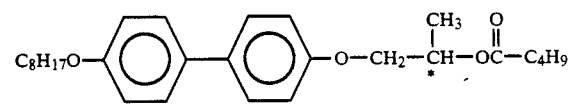

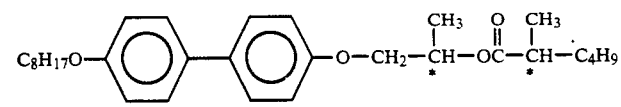

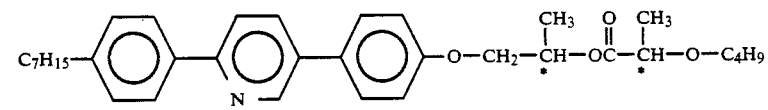

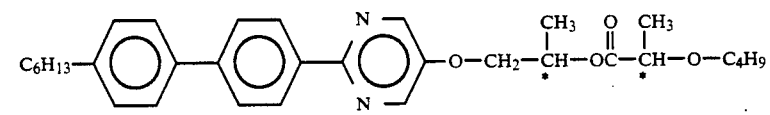

or

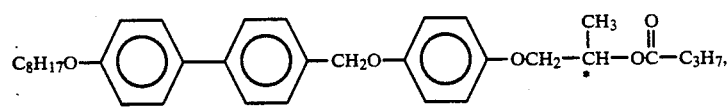

or 4'-heptyl-4-[4-{2-(butanoyloxy)-propoxy}-phenoxymethyl]-biphenyl or 4'-nonyl-4-[4-{2-(pentanoyloxy)-propoxy}-phenoxymethyl]-biphenyl.

7. A ferroelectric liquid crystal composition according to claim 1 wherein the compound represented by formula II comprises at least one of the compounds represented by the formulae

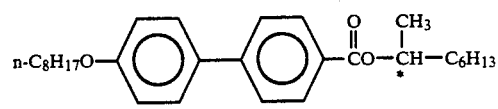

-continued

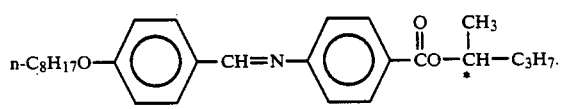

8. A light switching element comprising a ferroelectric liquid crystal composition which comprises at least one achiral compound represented by formula (I)

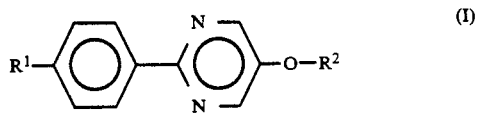

wherein each of R¹ and R² is an alkyl group having 1 to 18 carbon atoms;
at least one optically active compound represented by formula (II)

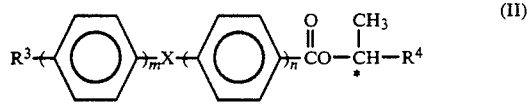 (II)

wherein $R^3$ is an alkyl group or an alkoxy group having 1 to 18 carbon atoms, $R^4$ is an alkyl group having 2 to 18 carbon atoms, X is a single bond, —COO—, —OCO—, —N=CH—, —CH=N—, —OCH$_2$— or —CH$_2$O—, each of m and n is an integer of 1 or 2, and the symbol * indicates an asymmetric carbon atom; and at least one compound represented by formula (III)

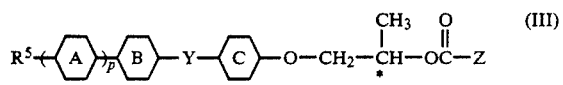 (III)

wherein each of

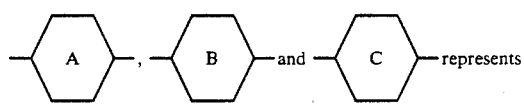 represents 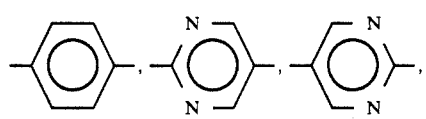

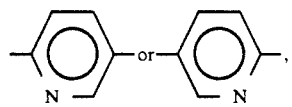

$R^5$ is an alkyl group or an alkoxy group having 1 to 18 carbon atoms, Y is a single bond, —CH$_2$O— or —OCH$_2$—, p is an integer of 0 or 1, and Z is an alkyl group having 1 to 18 carbon atoms or —C*H(CH$_3$)—O—R$^6$ is an alkyl group having 1 to 18 carbon atoms and the symbol * represents an asymmetric carbon atom.

9. A light switching element according to claim 8 wherein the proportion of the compound represented by formula (I) is from 20 to 98% by weight, that of the compound represented by formula (II) is from 1 to 40% by weight and that of the compound represented by formula (III) is from 1 to 40% by weight.

10. A light switching element which includes a ferroelectric liquid crystal composition according to claim 8, wherein the compound represented by the formula (I) comprises at least one compound wherein
$R^1$=n-C$_x$H$_{2x+1}$ and $R_2$=n-C$_y$H$_{2y+1}$ wherein
when x=6, y=6 to 15,
when x=7, y=5 to 12,
when x=8, y=3 to 13,
when x=9, y=2 or 6 to 13, or
when x=10, y=5 to 12.

11. A light switching element which includes a ferroelectric liquid crystal composition according to claim 8, wherein the composition represented by formula (II) comprises at least one compounds represented by the formulae

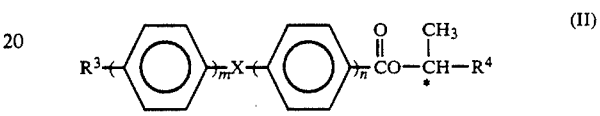 (II)

wherein $R^3$ is an alkyl group or an alkoxy group having 1 to 18 carbon atoms, and $R^4$ is an alkyl group having 2 to 18 carbon atoms.

12. A light switching element which includes ferroelectric liquid crystal composition according to claim 8 wherein the compound represented by formula II comprises at least one of the compounds represented by the formulae

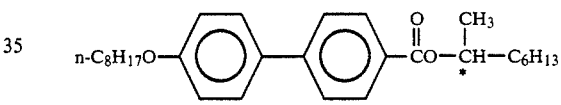

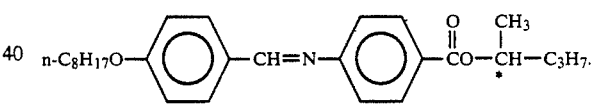

13. A light switching element which includes a ferroelectric liquid crystal composition according to claim 8 wherein the compound represented by the formula (III) comprises at least one of the compounds represented by the formulae

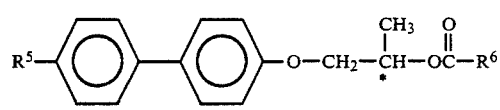

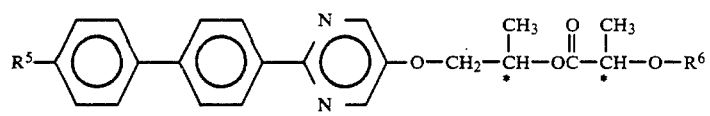

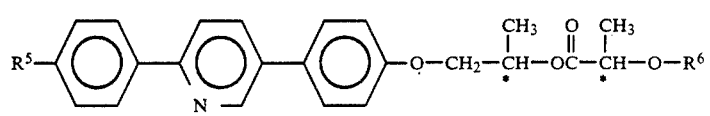

or

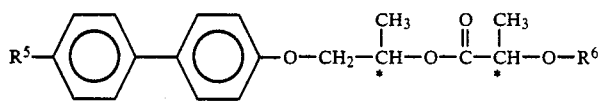

wherein $R^5$ is an alkyl group or an alkoxy group having 1 to 18 carbon atoms, and $R^6$ is an alkyl group having 1 to 18 carbon atoms.

14. A light switching element which includes a ferroelectric liquid crystal composition according to claim 8 wherein the compound represented by the formula (III) comprises at least one of

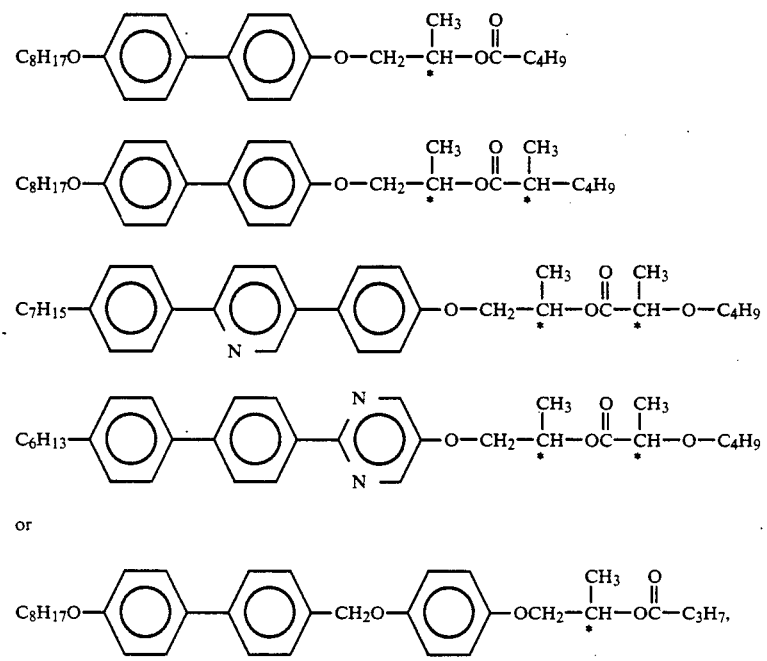

or 4'-heptyl-4-[4-{2-(butanoyloxy)-propoxy}-phenoxymethyl]-biphenyl or 4'-nonyl-4-[4-{2-(pentanoyloxy)-propoxy}-phenoxymethyl]-biphenyl.

* * * * *